United States Patent
Saarinen

(10) Patent No.: US 9,322,552 B2
(45) Date of Patent: Apr. 26, 2016

(54) METHOD AND EQUIPMENT FOR TREATING PROCESS GAS

(75) Inventor: Risto Saarinen, Espoo (FI)

(73) Assignee: Outotec Oyj, Espoo (FI)

( * ) Notice: Subject to any disclaimer, the term of this patent is extended or adjusted under 35 U.S.C. 154(b) by 1871 days.

(21) Appl. No.: 12/282,624

(22) PCT Filed: Apr. 2, 2007

(86) PCT No.: PCT/FI2007/000081
§ 371 (c)(1),
(2), (4) Date: Nov. 20, 2008

(87) PCT Pub. No.: WO2007/113375
PCT Pub. Date: Oct. 11, 2007

(65) Prior Publication Data
US 2009/0126530 A1 May 21, 2009

(30) Foreign Application Priority Data

Apr. 4, 2006 (FI) ...................................... 20060327

(51) Int. Cl.
*C22B 15/00* (2006.01)
*F23J 15/02* (2006.01)
*F23J 15/00* (2006.01)
*F27D 17/00* (2006.01)

(52) U.S. Cl.
CPC ............. *F23J 15/02* (2013.01); *C22B 15/0047* (2013.01); *C22B 15/0097* (2013.01); *F23J 15/003* (2013.01); *F27D 17/008* (2013.01); *F23J 2215/20* (2013.01)

(58) Field of Classification Search
None
See application file for complete search history.

(56) References Cited

U.S. PATENT DOCUMENTS

| 4,824,362 A * | 4/1989 | Kimura et al. ................. 432/13 |
| 4,908,058 A | 3/1990 | Saarinen |
| 5,281,252 A | 1/1994 | Landolt et al. |
| 6,887,298 B1 * | 5/2005 | Kojo et al. ...................... 75/585 |

FOREIGN PATENT DOCUMENTS

| JP | 10089601 | 4/1998 |
| WO | 03050464 | 6/2003 |

* cited by examiner

*Primary Examiner* — Yoshitoshi Takeuchi
(74) *Attorney, Agent, or Firm* — Chernoff, Vilhauer, McClung & Stenzel, LLP

(57) ABSTRACT

The invention relates to a method for treating solids-containing process gas in a suspension smelting furnace, comprising directing the process gas from the reaction shaft of the suspension smelting furnace to a lower furnace and, further, through a raised shaft to a waste heat boiler to cool the process gas, whereby, through one or more gas nozzles placed on the lower furnace top wall, oxidizing gas is fed into the process gas flowing in the lower furnace, whereby the amount of oxidizing gas is adjusted during the process so that the amount of sulphides contained in the solid matter of the process gas that is directed to the waste heat boiler is minimized. The invention also relates to the equipment.

9 Claims, 1 Drawing Sheet

METHOD AND EQUIPMENT FOR TREATING PROCESS GAS

This is a national stage application filed under 35 USC 371 based on International Application No. PCT/FI2007/000081 filed Apr. 2, 2007, and claims priority under 35 USC 119 of Finnish Patent Application No. 20060327 filed Apr. 4, 2006.

The invention relates to a method and equipment for treating solids-containing process gas that is in a suspension smelting furnace.

For recovering metals, such as copper, nickel or lead, from sulphidic raw materials, such as ores or concentrates containing these metals, a suspension smelting method is commonly used, wherein the heat volumes contained in the fine-grained sulphidic raw materials are exploited. In addition to the sulphidic raw materials, oxygenous gas, such as air, oxygen-enriched air or oxygen is fed into the reaction space of the suspension smelting furnace. In addition, e.g., fine dust, which is recovered from the flue gases of the suspension smelting furnace and recirculated, and flux, a substance forming metallurgic slag, are fed into the reaction space. In the reaction space of the suspension smelting furnace, the solid and gaseous feed materials react with one another so that at least two molten phases, a slag phase and the rock phase contained in the metal to be exploited are formed in the lower part of the suspension smelting furnace, i.e. the lower furnace. The molten phases formed in the lower furnace of the suspension smelting furnace are removed from the suspension melting furnace periodically. Instead, the process gases containing sulphur dioxide, which are formed in the reaction space of the suspension smelting furnace, are directed through the lower furnace to the raised shaft of the suspension smelting furnace and, further, from the raised shaft to the waste heat boiler connected to the suspension smelting furnace, where the flue gases of the suspension smelting furnace are cooled. In the waste heat boiler, the fine dust is reacted with sulphur dioxide and oxygen, whereby the solid matter is sulphated. Sulphating preferably takes place in a suspension space in the emission part of the waste heat boiler before the gases go to a convection space, wherein the reaction in question may form solid matter aggregations on the surfaces of the boiler pipes, the aggregations being difficult to remove. Sulphating is enhanced by an oxygenous gas that is fed into the waste heat boiler.

In a suspension smelting process, such as the flash smelting process, which produces copper metal, the copper content of the rock is controlled by means of oxidizing reactions, which refer to the partial combustion of the concentrate. As the furnace produces copper metal, which requires the presence of sulphur, the process is adjusted by the scarcity of oxygen so that part of the concentrate remains in the sulphidic state. This means that the oxidizing reactions consume all of the oxygen in the oxygen-enriched air that is fed from the enrichment burner, whereby parts of the sulphur and iron remain unburned in the sulphuric state in the fine dust. Part of the sulphides in the dust may burn in the lower furnace under the effect of leakage air, but as the cold air is slowly mixed with the hot process air, the major part of the sulphides enters the waste heat boiler along with the gas flow. Therefore, the dust travelling along with the process gas is partly sulphidic. The sulphur content of the dust in the lower furnace of the flash smelting furnace is known to be from 10 to 20%. When going to the waste heat boiler, the sulphide contained in the fine dust continues to burn in the waste heat boiler, causing problems. In the waste heat boiler, the sulphides begin to burn with the sulphating air, whereby heat is released and agglomerations form on the surfaces of the boiler pipes. The sulphating of the dust also slows down, as part of the oxygen of the sulphating air is consumed in burning the sulphides. The problems caused by the dust agglomerations mainly occur as follows: the convection cooling packages in the convection part of the waste heat boiler clog up, the pipe between the waste heat boiler and the electrostatic precipitator connected thereto clog up, and agglomerations form on the emitter electrodes of the electrostatic precipitator.

The purpose of the present invention is to provide an improved way to treat the process gas flowing in the lower furnace of the suspension smelting furnace before the process gas goes into the waste heat boiler. In particular, the purpose of the invention is to feed oxidizing gas into the process gas flowing in the lower furnace to minimize the amount of sulphides contained in the solid matter of the process gas that is directed to the waste heat boiler.

According to the invention, the solids-containing process gas in the suspension smelting furnace is directed from the reaction shaft of the suspension smelting furnace to the lower furnace and, further, through the raised shaft to the waste heat boiler to cool the process gas, whereby, through one or more gas nozzles placed on the top wall of the lower furnace, oxidizing gas is fed into the process gas flowing in the lower furnace, whereby the amount of oxidizing gas is adjusted during the process so that the amount of sulphides contained in the solid matter of the process gas that is directed to the waste heat boiler is minimized. Hence, the sulphating reactions in the waste heat boiler can be enhanced and the generation of agglomerations reduced. By feeding an amount of oxidizing gas, which is in proportion to the process conditions, into the process gas flowing in the lower furnace, a preferable composition of the process gas is obtained before it goes into the waste heat boiler. Feeding the oxidizing gas into the lower furnace is also advantageous for the energy economy of the suspension smelting furnace, as the reaction heat, which is generated when the sulphides burn, is released in the furnace instead of the waste heat boiler. Consequently, the need for additional fuel in the lower furnace is reduced.

In the following, the invention is described in detail with reference to the appended drawings, in which.

Figure 1:
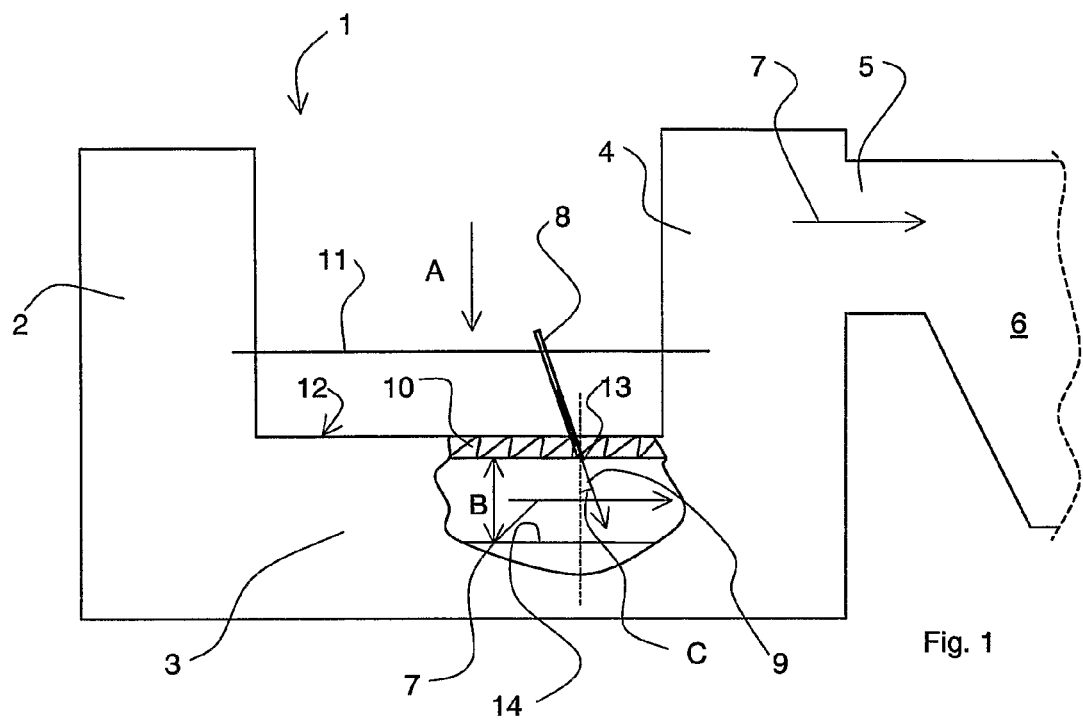
FIG. 1 shows a schematic, partly cut side view of a preferred embodiment of the invention.
Figure 2:
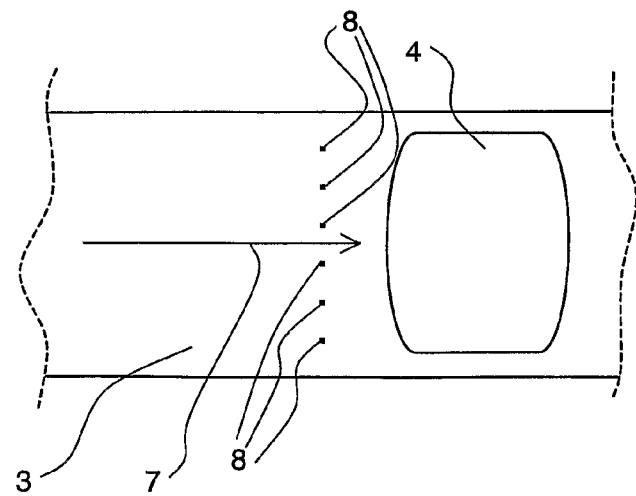
FIG. 2 shows a section of FIG. 1 in direction A.

According to FIGS. 1 and 2, the sulphur dioxide-containing gases formed by smelting in the reaction space 2 of the suspension smelting furnace 1 exit through the lower furnace 3 to the raised shaft 4 of the suspension smelting furnace. The raised shaft 4 is connected through an opening 5 to the waste heat boiler 6, where the sulphur dioxide-containing flue gases are cooled. In the reaction space 2 of the suspension smelting furnace, the solid and gaseous feed materials react with one another so that at least two molten phases, a slag phase and the rock phase containing the metal to be exploited, are formed in the lower part of the suspension smelting furnace, i.e. the lower furnace 3. According to the invention, oxidizing gas 9 is fed as a jet through the gas nozzles 8, which are placed on the top wall 12 of the lower furnace, into the process gas 7 flowing in the lower furnace, so that the metal sulphides in the process gas oxidize before going into the waste heat boiler and do not continue burning in the waste heat boiler. The top wall of the lower furnace refers to a plane between the reaction shaft and the raised shaft. The gas nozzles 8 are made of a durable material, such as acid-resistant metal tube. The feed rate of the oxidizing gas 9 is adjusted during the process so that the amount or the content of sulphides contained in the solid matter of the process gas directed to the waste heat boiler 6 is minimized. The amount and the feeding speed of the oxidizing gas, e.g., pure oxygen, which is fed, are adjusted as desired by means of the process control.

The gas nozzles 8 for injecting the oxidizing gas 9 are placed on the top wall 12 of the lower furnace so that they extend through the refractory lining 10 of the top wall to a desired height in the gas space of the lower furnace. The gas nozzles 8 are supported at their upper parts, for example, by the service plane 11 of the furnace, from where they can be accessed and adjusted. It is preferable that the injection point 13 of the gas nozzle, i.e., the point through which the oxidizing gas is fed, is over 1000 millimeters from the upper edge 14 of the molten surface of the lower furnace. The distance B between the molten surface 14 and the injection point 13 is preferably over 1000 mm. According to an example, the oxidizing gas 9 includes oxygen fed from six gas nozzles 8, which are placed on the top wall 12 of the lower furnace near the raised shaft 4. The oxidizing gas 9 is fed with the gas nozzles being in a given angle C, such as a 45-degree angle to the direction of the process gas flow 7 in the lower furnace. The process gas in the lower furnace 3 flows in a horizontal direction perpendicular to the raised shaft 4. Hence, the flow direction of the oxidizing gas 9 meets the process gas flowing in the lower furnace in an advantageous angle, and it is ensured that all the solid matter contained in the process gas flow, i.e., the fine dust, is oxidized under the effect of the oxidizing gas 9 that is fed. The amount of oxidizing gas is also in proportion to the amount of dust contained in the total gas amount flowing in the lower furnace, and its sulphur content and the size of the furnace. The amount of gas fed into the lower furnace 3 is from 0.2 to 5%, preferably from 0.8 to 2% of the total amount of the process gas flowing in the lower furnace of the suspension smelting furnace. The gas nozzles 8 are placed on the top wall 12 of the lower furnace at desired intervals; however so that the oxidizing gas fed through them is evenly distributed in the lower furnace. The position of the gas nozzles can also vary with respect to each other, depending on the inclination of the top wall and the process. Naturally, the shape of the top wall 12 of the lower furnace 3 should be taken into consideration when arranging the gas nozzles. By changing the inner diameters of the gas nozzles, the speed of the oxidizing gas that is fed can be influenced. A preferred speed of the oxidizing gas that is fed is accomplished with a preferred inner diameter of 30 to 90 mm. According to a preferred embodiment of the invention, there are at least three gas nozzles, such as 4 to 6 nozzles, on the top wall of the lower furnace.

EXAMPLE

The invention is illustrated by the appended example. According to the example, copper metal is manufactured in the suspension smelting furnace. Oxidizing gas in injected into the lower furnace of the suspension smelting furnace to minimize the amount of sulphides contained in the solid matter of the process gas exiting the suspension smelting furnace. According to the example, the total process gas flow in the lower furnace is 70000 $Nm^3/h$ and the sulphur content of the solid matter or dust travelling along with it as a suspension is 12.2%. 1350 $Nm^3/h$ of oxygen is needed to oxidize the sulphur content of the dust travelling as suspension, which is established by means of the oxidizing reactions of the dust. Oxygen is used as oxidizing gas, being blown to the lower furnace through six gas nozzles with an inner diameter of 70 millimeters. The gas nozzles are placed on the curved top wall of the lower furnace near the raised shaft. The four middle-most nozzles are placed in a 45-degree angle and the two outermost ones in a 30-degree angle to the process gas flow for the oxidizing gas sprayed by them to meet the process gas flow in the lower furnace in a correct position. With such a dimensioning, oxygen can be injected in an amount of 150 to 250 $Nm^3/h$ per nozzle, totalling 900 to 1500 $Nm^3/h$, when necessary, at the same time achieving an effective mixing of the oxygen with the main gas flow without the oxygen jet reaching the molten surface. The distance of the lower furnace top wall from the molten surface varies within 1.8 and 2.2 m on the centre line of the furnace and within 1 and 1.4 m near the walls of the lower furnace. The difference between the above-mentioned distances of the centre line and the proximity to the walls is due to the curved shape of the lower furnace top wall, whereas the variation is due to the normal variation of the molten surface during operation. According to the presented example, the amount of sulphur contained in the fine dust of the process gas flow can essentially be reduced before the process gas goes into the waste heat boiler.

It is obvious to those skilled in the art that the various embodiments of the invention are not limited to the examples above but can vary within the scope of the appended claims.

The invention claimed is:

1. A method of operating a suspension smelting furnace that includes a reaction shaft, a lower furnace, a raised shaft and a waste heat boiler, wherein a solids-containing process gas is produced in the reaction shaft, said method comprising:
    directing the process gas from the reaction shaft of the suspension smelting furnace to the lower furnace and, further, through the raised shaft to the waste heat boiler to cool the process gas,
    feeding a controlled amount of oxidizing gas in a jet that is oblique to the process gas flow into the process gas flowing in the lower furnace through at least one gas nozzle disposed in a top wall of the lower furnace and opening of the at least one gas nozzle at a height of at least one meter above a free surface of molten material in the lower furnace, and
    adjusting the amount of oxidizing gas so that the amount of sulfides contained in the solid matter of the process gas that is directed to the waste heat boiler is reduced.

2. A method according to claim 1, comprising feeding the oxidizing gas in a jet at an angle of 30 to 60° to the process gas flow.

3. A method according to claim 1, comprising controlling the amount of oxidizing gas such that the amount of oxidizing gas fed into the process gas flowing in the lower furnace is from 0.2 to 5% of the total amount of process gas flowing in the lower furnace.

4. A method according to claim 1, comprising controlling the amount of oxidizing gas such that the amount of oxidizing gas fed into the process gas flowing in the lower furnace is from 0.8 to 2% of the total amount of process gas flowing in the lower furnace.

5. A method according to claim 1, comprising feeding the oxidizing gas through a number of gas nozzles dependent on process conditions.

6. A method according to claim 1, comprising feeding the oxidizing gas through at least three gas nozzles.

7. A method according to claim 1, comprising feeding the oxidizing gas into the process gas through at least one nozzle with an inner diameter of 30 to 90 mm.

8. A method according to claim 1, comprising feeding oxygen or oxygen-enriched air as the oxidizing gas.

9. A method according to claim 1, comprising feeding sufficient oxygen to oxidize substantially all solids present in the process gas.

* * * * *